US009528414B2

(12) United States Patent
Mitchell et al.

(10) Patent No.: US 9,528,414 B2
(45) Date of Patent: Dec. 27, 2016

(54) DIESEL EXHAUST FLUID DEPOSIT MITIGATION

(71) Applicant: Cummins Emission Solutions, Inc., Columbus, IN (US)

(72) Inventors: Douglas A. Mitchell, Indianapolis, IN (US); Mihai Chiruta, Madison, WI (US); Lindsey R. Henry, Madison, WI (US); Jim Alonzo, Verona, WI (US)

(73) Assignee: CUMMINS EMISSION SOLUTIONS, INC., Columbus, IN (US)

( * ) Notice: Subject to any disclaimer, the term of this patent is extended or adjusted under 35 U.S.C. 154(b) by 0 days.

(21) Appl. No.: 14/512,097

(22) Filed: Oct. 10, 2014

(65) Prior Publication Data

US 2015/0101313 A1    Apr. 16, 2015

Related U.S. Application Data

(60) Provisional application No. 61/890,764, filed on Oct. 14, 2013.

(51) Int. Cl.
| | | |
|---|---|---|
| *F01N 3/00* | (2006.01) | |
| *F01N 3/20* | (2006.01) | |
| *F01N 3/28* | (2006.01) | |
| *F01N 13/08* | (2010.01) | |

(52) U.S. Cl.
CPC ............. *F01N 3/2066* (2013.01); *F01N 3/28* (2013.01); *F01N 3/2892* (2013.01); *F01N 13/08* (2013.01); *F01N 2610/02* (2013.01); *F01N 2610/1453* (2013.01); *Y02T 10/24* (2013.01)

(58) Field of Classification Search
USPC ................ 60/274, 286, 287, 288, 295, 301, 303,60/324
See application file for complete search history.

(56) References Cited

U.S. PATENT DOCUMENTS

| | | | |
|---|---|---|---|
| 7,497,077 B2 | 3/2009 | Dodge et al. | |
| 7,682,586 B2 | 3/2010 | Harold et al. | |
| 7,730,721 B2 * | 6/2010 | Kimura | ................. F01N 3/2066 60/286 |

(Continued)

FOREIGN PATENT DOCUMENTS

| | | |
|---|---|---|
| CN | 102840014 | 12/2012 |
| EP | 1 339 479 | 9/2003 |

(Continued)

OTHER PUBLICATIONS

The extended European Search Report issued in European Application No. 14188709.1, dated Mar. 13, 2015.

(Continued)

*Primary Examiner* — Binh Q Tran
(74) *Attorney, Agent, or Firm* — Foley & Lardner LLP

(57) ABSTRACT

One form of the present application is an apparatus including an internal combustion engine structured to produce an exhaust flow, an exhaust system structured to receive the exhaust flow, and a reductant injector structured to inject reductant into a primary passage of the exhaust system upstream of a catalyst. The apparatus further includes an injector passage structured to receive a portion of exhaust upstream of the injector and further structured to flow the exhaust into the primary passage around the injector in a manner such that deposit formation is reduced.

24 Claims, 7 Drawing Sheets

(56) References Cited

U.S. PATENT DOCUMENTS

| | | | |
|---|---|---|---|
| 8,079,211 B2 * | 12/2011 | Levin | B01F 3/04049 60/274 |
| 8,240,137 B2 | 8/2012 | Liu et al. | |
| 8,359,832 B2 * | 1/2013 | Yi | B01F 3/04049 422/172 |
| 8,549,842 B2 | 10/2013 | Park | |
| 8,726,643 B2 * | 5/2014 | Way | F01N 3/2066 60/286 |
| 8,800,276 B2 * | 8/2014 | Levin | B01F 5/0268 261/79.2 |
| 8,899,022 B2 * | 12/2014 | Haverkamp | F01N 3/2066 60/286 |
| 8,959,900 B2 * | 2/2015 | Solbrig | F01N 3/0253 60/286 |
| 2008/0155973 A1 * | 7/2008 | Maruyama | F01N 3/2066 60/299 |
| 2010/0107614 A1 | 5/2010 | Levin et al. | |
| 2010/0212292 A1 * | 8/2010 | Rusch | F01N 3/2066 60/274 |
| 2010/0263359 A1 | 10/2010 | Haverkamp et al. | |
| 2011/0094206 A1 | 4/2011 | Liu et al. | |
| 2012/0124983 A1 | 5/2012 | Hong | |
| 2013/0152558 A1 | 6/2013 | Loman | |
| 2013/0174537 A1 | 7/2013 | Loman et al. | |
| 2013/0239546 A1 | 9/2013 | Levin et al. | |

FOREIGN PATENT DOCUMENTS

| | | |
|---|---|---|
| EP | 1 741 887 | 1/2007 |
| EP | 2 014 883 | 1/2009 |
| EP | 2 339 137 | 6/2011 |
| EP | 2 339 139 | 6/2011 |
| EP | 2 388 451 | 11/2011 |
| WO | WO-2012/044233 | 4/2012 |
| WO | WO-2012/053960 | 4/2012 |
| WO | WO-2013/112146 | 8/2013 |
| WO | WO-2013/178321 | 12/2013 |

OTHER PUBLICATIONS

Communication pursuant to article 94 (3)EPC for European Patent Application No. 14188709.1, issued Jun. 9, 2016, 4 pages.

* cited by examiner

DIESEL EXHAUST FLUID DEPOSIT MITIGATION

CROSS-REFERENCE TO RELATED APPLICATIONS

The present application claims priority to U.S. Provisional Patent Application No. 61/890,764, filed Oct. 14, 2013, and entitled "DIESEL EXHAUST FLUID DEPOSIT MITIGATION," the contents of which are incorporated herein by reference in its entirety.

BACKGROUND

Selective catalytic reduction ("SCR") exhaust aftertreatment systems are an important technology for reducing NOx, emissions from internal combustion engines. SCR systems generally include a source of storage for the diesel exhaust fluid (DEF), a doser that includes at least one of a pump unit for pressurizing the DEF and a metering unit for providing a controlled amount or rate of DEF, and an injector which provides a DEF solution to a decomposition region of an exhaust flow path located upstream from an SCR catalyst. Many SCR systems also utilize pressurized gas to assist the flow of DEF to the injector. While providing reductions in NO, emissions, SCR systems suffer from a number of shortcomings and problems.

The DEF injected into the exhaust flow may not properly mix with the exhaust flow. In some instances, the DEF can puddle along an inner wall of the exhaust system, forming a deposit over time. Thus, there is a need for advancements mitigating these and other shortcomings associated with injection systems for delivery of DEF through a nozzle connected to an exhaust system.

SUMMARY

One embodiment of the present application is a unique flow arrangement for a DEF injector. Other embodiments include apparatuses, systems, devices, hardware, methods, and combinations for altering an exhaust flow to increase mixing of DEF with an exhaust flow and/or to prevent DEF deposits.

Various embodiments provide for a system including an internal combustion engine operable to produce an exhaust gas flow; a reductant injector structured to release a reductant into the exhaust gas flow; a catalyst located downstream of the reductant injector; and a bend located in a portion of an exhaust gas passageway. The exhaust gas passageway is structured to receive at least a portion of the exhaust gas flow. The bend is structured to affect a mixing of the reductant into the exhaust gas flow and/or to reduce a formation of a reductant film on an inner wall of the exhaust gas passageway.

Additional embodiments provide for an apparatus, comprising an internal combustion engine structured to produce an exhaust flow; an exhaust system structured to receive the exhaust flow; a reductant injector structured to inject reductant into a primary passage of the exhaust system upstream of a catalyst; and an injector passage structured to receive a portion of exhaust upstream of the injector. The injector passage is further structured to flow the exhaust into the primary passage around the injector in a manner such that injector tip deposit formation is mitigated.

Further embodiments provide for a method, comprising operating an internal combustion engine including a rotating assembly, whereby an exhaust flow is produced. The method further comprises selectively injecting a reductant into a main portion of the exhaust flow, and diverting a first portion of exhaust across a tip of the injector, thereby reducing reductant deposits thereon.

Still further embodiments provide for a decomposition mitigation assembly. A decomposition tube elbow includes an inner bend wall portion and an outer bend wall portion. An injector port is formed in the outer wall portion, the injector port configured to receive a reductant injector therein. An injection exhaust flow path divider wall is positioned in the decomposition tube elbow. The injection exhaust flow path divider wall forms a first pocket extending along at least a portion of the radially outer wall portion, the injector port opening to the first pocket. A bypass exhaust flow path divider wall is positioned in the decomposition tube elbow. The bypass exhaust flow path divider wall forms a second pocket extending along at least a portion of the inner bend wall portion of the decomposition tube elbow. The bypass exhaust flow path divider wall and the injection exhaust flow path divider wall form a primary exhaust flow path positioned in the decomposition tube elbow between the injection exhaust flow path divider wall and the bypass exhaust flow path divider wall.

Further embodiments, forms, features, aspects, benefits, and advantages of the present application shall become apparent from the description and figures provided herewith.

DETAILED DESCRIPTION OF EXEMPLARY EMBODIMENTS

Figure 1:
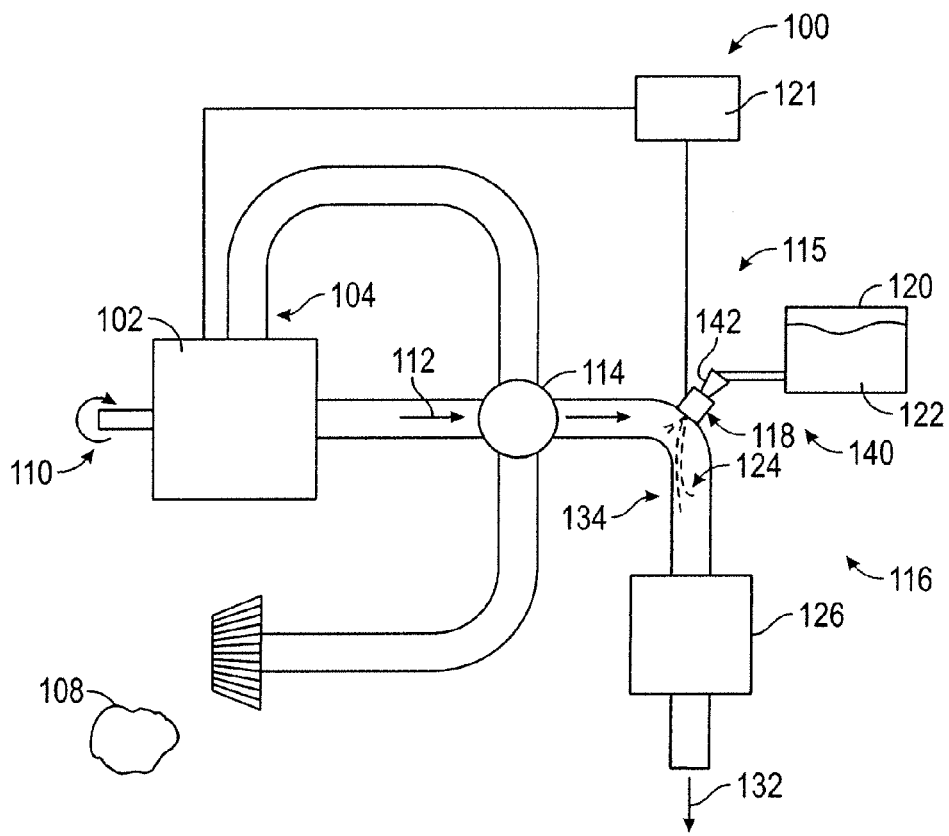
FIG. 1 is a schematic view of an exemplary DEF delivery system.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

With reference to FIG. 1 there is illustrated an exemplary system 100 that includes a delivery system 140 for delivery of a suitable reductant 122, such as DEF to an exhaust system 115 connected to an engine 102. The system 100 may be provided on a vehicle powered by the engine 102, or on the engine 102 may be utilized in other applications such as non-vehicular power generation systems, pumping systems, or any other application which receives a useful power 110 from the engine 102. The engine 102 can be a diesel engine or any suitable internal combustion engine for which exhaust treatment with the reductant 122 is provided. The engine 102 includes an intake system 104 through which charge air enters. An exhaust gas 112, resulting from combustion, exits the engine 102 via the exhaust system 115. It should be understood that not all details of these systems that are typically present are shown. In some forms, the intake system 104 can receive pressurized air from a pressure source such as a turbocharger 114. The engine 102 can include a number of combustion chambers into which fuel is injected to combust with the charge air that has entered through an intake port in the engine 102 (not shown). The energy released by combustion causes an expansion that provides useful power transmitted via at least one piston (not shown). When used to propel a vehicle, the engine 102 is coupled through a drivetrain (not shown) to drive wheels that propel the vehicle. Intake valves (not shown) control the admission of charge air into the cylinders, and exhaust valves (not shown) control the outflow of the exhaust gas 112 through the exhaust system 115 and ultimately to the atmosphere 108. Before entering the atmosphere 108, the exhaust gas 112 is treated by one or more aftertreatment devices in an aftertreatment system 116.

In one example, the aftertreatment system 116 having one or more selective catalytic reduction (SCR) catalysts 126 and one or more locations for receiving the reductant 122, which includes, but is not limited to, diesel exhaust fluid (DEF) from the delivery system 140. The aftertreatment system 116 may include one or more other aftertreatment components, including, but not limited to, one or more oxidation catalysts, one or more particulate filters, an ammonia oxidation catalyst, and various temperature, pressure and constituent sensor of the exhaust gas 112. The intake system 104 may also include various components not shown, such as an exhaust gas recirculation (EGR) system, various heat exchangers, and other components connecting the exhaust system 115 to the intake system 104. A DEF injector 118 is mounted on a portion of the exhaust system 115 upstream of the SCR catalyst 126 having an outlet, or nozzle, arranged to spray aqueous DEF droplets 124 into the exhaust system 115 where it mixes with the exhaust gas 112 produced by the engine 102. The SCR catalyst 126 promotes a chemical reaction between the reductant 122 and NOx, in the exhaust gas 112 that converts substantial amounts of NOx to reduce NOx emissions before the exhaust gas 112 passes into the atmosphere 108.

The delivery system 140 further includes a doser 142 that receives the reductant 122 from a storage tank 120 and provides the reductant 122 to the injector 118 for injection or delivery to a decomposition chamber 134 positioned in the exhaust system 115 or directly into the exhaust system 115. As used herein, injector includes any nozzle, static device, electronically controllable device, and/or mechanical actuator that provide an outlet for DEF delivery. One example of a suitable diesel exhaust fluid comprises a solution of 32.5% high purity urea and 67.5% deionized water. It shall be appreciated, however, that other DEF solutions and reductants may also be utilized.

The doser 142 may include various structures to facilitate receipt of the reductant 122 from the storage tank 120 and the delivery of the reductant 122 to the exhaust system 115. For example, the doser 142 can include a pump and a filter screen and a check valve upstream of the pump to receive the reductant 122 from the storage tank 120. In one form, the pump is a diaphragm pump, though it shall be appreciated that any other type of pump may be utilized. The pump can output pressurized reductant 122 at a predetermined pressure which can flow through a second check valve, a pulsation dampener, and a second filter to provide pressurized reductant to a metering valve. The doser 142 can further include a bypass line around the pump having a bypass valve which is operable to open and close to permit or prevent the flow of the reductant 122 through the bypass line to a location upstream of the first filter screen where it may be returned to the storage tank 120, for example, during a purging operation.

The doser 142 can be of an airless configuration, in that the injector 118 can discharge the reductant 122 without a combined flow of pressurized air. Storage tank 120 holds a supply of the reductant 122 and can be vented to allow the reductant to be withdrawn at a port. A conduit extends from the port to the doser 142. The doser 142 is in fluid communication with the injector 118. When the doser 142 operates, it can draw the reductant 122 from the storage tank 120 through the conduit, and can pump the reductant to the injector 118. A backflow conduit (not shown) may be provided to return excess amounts of the reductant 122 to the storage tank 120. The doser 142 can be controlled through a controller 121.

Figure 2:
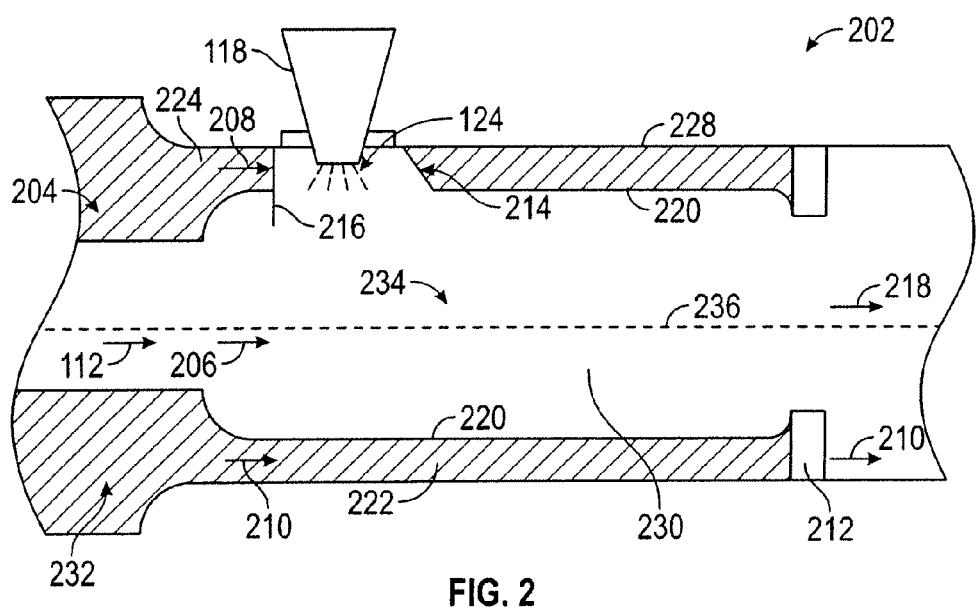
FIG. 2 is a cross-sectional view of a flow separator disposed in combination with a DEF injector.

FIG. 2 illustrates one form of a deposit mitigation system 202. A reduction orifice 204 is disposed within a portion of an exhaust passageway 228. The reduction orifice 204 can be structured to reduce deposits of the reductant 122 and/or to increase the reductant 122 and the exhaust gas 112 mixing. The reduction orifice 204 can be structured to increase heat transfer to an inner surface 220, to reduce an impingement of the reductant 122 upon the inner surface 220, and to reduce stagnation of droplets of the reductant 122 near the nozzle of the injector 118. When the reductant 122 is injected, some of the reductant 122 can impact the inner surface 220 of the exhaust passageway 228. If a temperature of the inner surface 220 is greater than a reductant film evaporative temperature, the reductant 122 is evaporated into the exhaust gas 112 and leaves the inner surface 220. When the reductant 122 evaporates, heat is transferred from the inner surface 220 and the surface temperature can be reduced. If the surface temperature of the inner surface 220 is less than the reductant 122 film evaporative temperature, the reductant 122 can remain on the surface and a deposit can form.

The reduction orifice 204 begins upstream of the injector 118. The reduction orifice 204 defines an injector flow path 224, a primary flow path 230, and a bypass flow path 222. The reduction orifice 204 divides the flow of the exhaust gas 112 from the engine 102 into an injector flow 208, a primary flow 206 and a bypass flow 210. In one form, the reduction orifice 204 can be of an annular configuration disposed radially outward from a centerline 236.

The reduction orifice 204 can be of any size and configuration such that, an injector flow 208 aids in mixing and discharge of a spray plume of the aqueous DEF droplets 124 into the primary flow 206 and/or a heat transfer from the exhaust gas 112 to the inner surface 220 is increased. The reduction orifice 204 can be structured to alter a velocity of the injector flow 208 and the bypass flow 210, relative to the primary flow 230, such that a reductant deposit near the injector 118 and/or on the inner surface 220 can be mitigated or prevented. The reduction orifice 204 can include an extension 232 which is provided to divert a desired flow into the bypass flow path 222 and the injector flowpath 224. As the flow of the exhaust gas 112 approaches the reduction orifice 204, the flow of the exhaust gas 112 is divided into the bypass flow 210, the primary flow 206, and the injector flow 208. A blockage 214 located in the injector flow path 224 downstream of the injector 118 forces the injector flow 208 radially inward into the primary flow path 230. The blockage 214 can include various tapers or angles to reduce DEF drift buildup thereon. The reduction orifice 204 can further include an extension, such as lip 216 to protect the reduction orifice 204 from the spray plume of the aqueous DEF droplets 124. In operation, the injector 118 injects the reductant 122 radially inward, the spray plume of the aqueous DEF droplets 124 being carried toward the centerline 236 by the injector flow 208 and in response to the injector pressure and the primary flow 206. The injector flow 208 can provide a heated steady flow of the exhaust gas 112 across the injector 118 such that injector deposits can be reduced or prevented. The DEF spray plume of the aqueous DEF droplets 124, combined with the injector flow 208, is illustrated as a mixed flow 234.

The bypass flow 210 increases a surface temperature of the inner surface 220 of the bypass passage 222. Unlike a typical exhaust outer wall in which one surface is subject to ambient temperatures of the 108, heated exhaust can be passed over both the interior and exterior surfaces of the inner surface 220 via the bypass flow path 222 and the primary flow path 230. This increase in surface temperature can readily evaporate DEF surface puddling, and therefore can mitigate deposits along the inner surface 220.

A plurality of mixing devices 212 can be disposed downstream of the bypass flow path 222. As was previously discussed, the bypass flow path 222 can extend circumferentially about a portion of the centerline 236. The mixing devices 212 can be slits, perforations, or other features which allow the amount of bypass flow 210 to be adjusted or modeled in response to a desired mixing or wall film thickness. In some forms, the mixing devices 212 can be utilized to control the injector flow 208. Additionally, the length and circumferential extension of the bypass flow path 222 can be application specific and may be determined based upon a desired DEF film thickness and/or heat transfer from bypass flow path 222 to the inner surface 220. In some forms, the mixed flow 234, the primary flow 206, and the bypass flow 210 are combined upon exit of the decomposition chamber 134 into flow 218 to be received by the SCR catalyst 126. The mixing devices 212 in addition to a bend, to be discussed in FIG. 3, can reduce the need for additional mixing devices.

Figure 3:
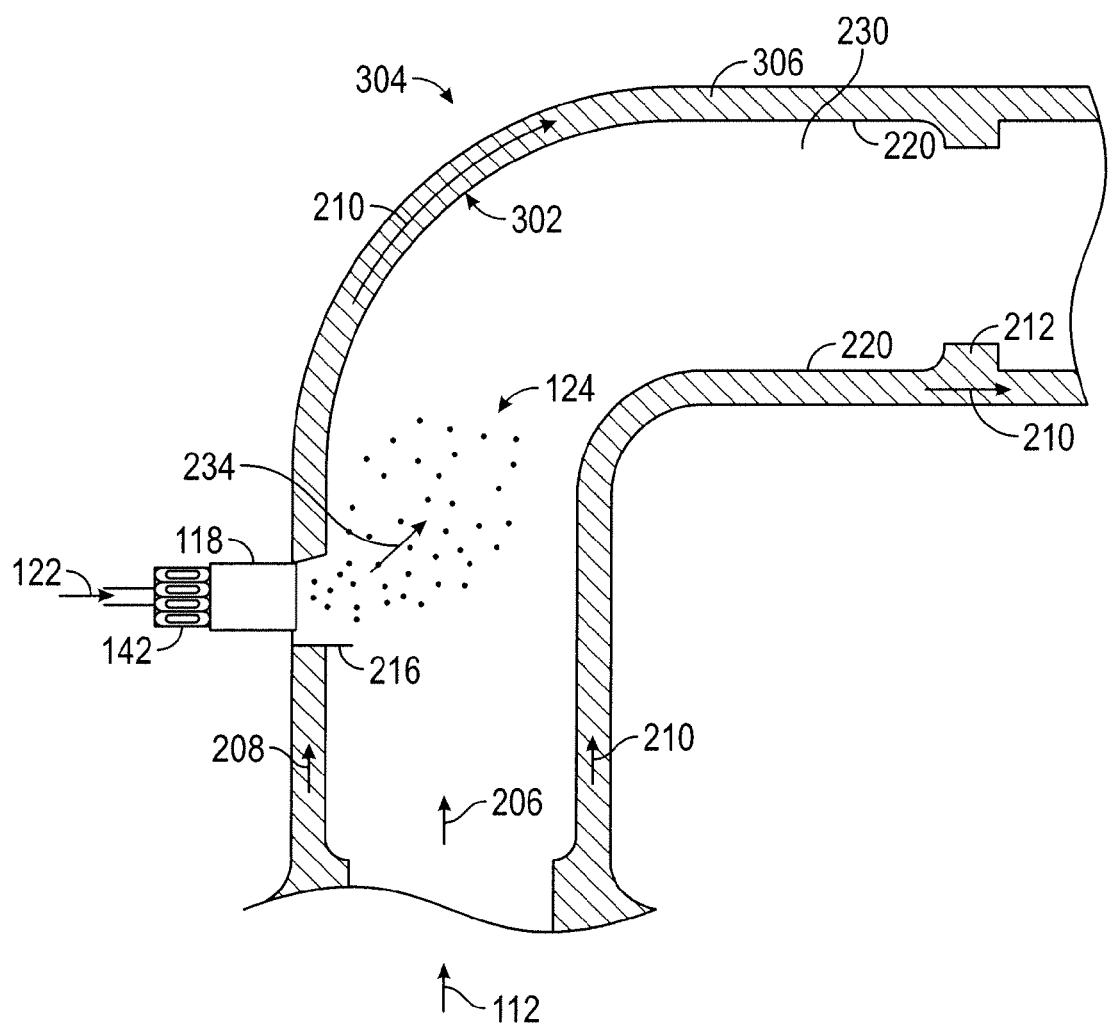
FIG. 3 is a cross-sectional view of another form of a flow separation device including a bend.

Referring now to FIG. 3, a bend 304 is illustrated in the exhaust system 115. The bend 304 is structured to impart turbulence to the flow of the exhaust gas 112 which can aid with mixing of the DEF spray of the aqueous DEF droplets 124 and/or can increase heat transfer to desired locations within the exhaust system 115. In one form, the injector 118 is located upstream of the bend. However, it is contemplated that the injector 118 be located on the bend 304 or near the bend 304 in any manner such that the bend 304 has an effect upon the DEF spray of the aqueous DEF droplets 124, missing of the DEF and/or upon the downstream DEF film. The bend 304 is illustrated as a 90 degree elbow; however, any type of bend 304 may be utilized depending upon the specific application and desired flow affect.

Illustrated at 302 is an area of the inner surface 220 where the reductant 122 may puddle. In order to prevent the aforementioned deposits at 302, bypass flow 210 can flow through passage 306 thereby increasing heat transfer from the exhaust gas 112 to the inner surface 220.

Additionally, the injector flow 208 can assist in directing the mixed flow 234 toward a centerline of the primary flow 230 away from the inner surface 220. The mixing devices 212 can further release clean (non DEF) exhaust downstream of the decomposition tube to further aid in the prevention of impingement of the reductant 122 upon the inner surface 220. The bend 304 itself, can provide a reduction in deposits through an increase in mixing the reductant 122 into the exhaust gas 112.

Figure 4:
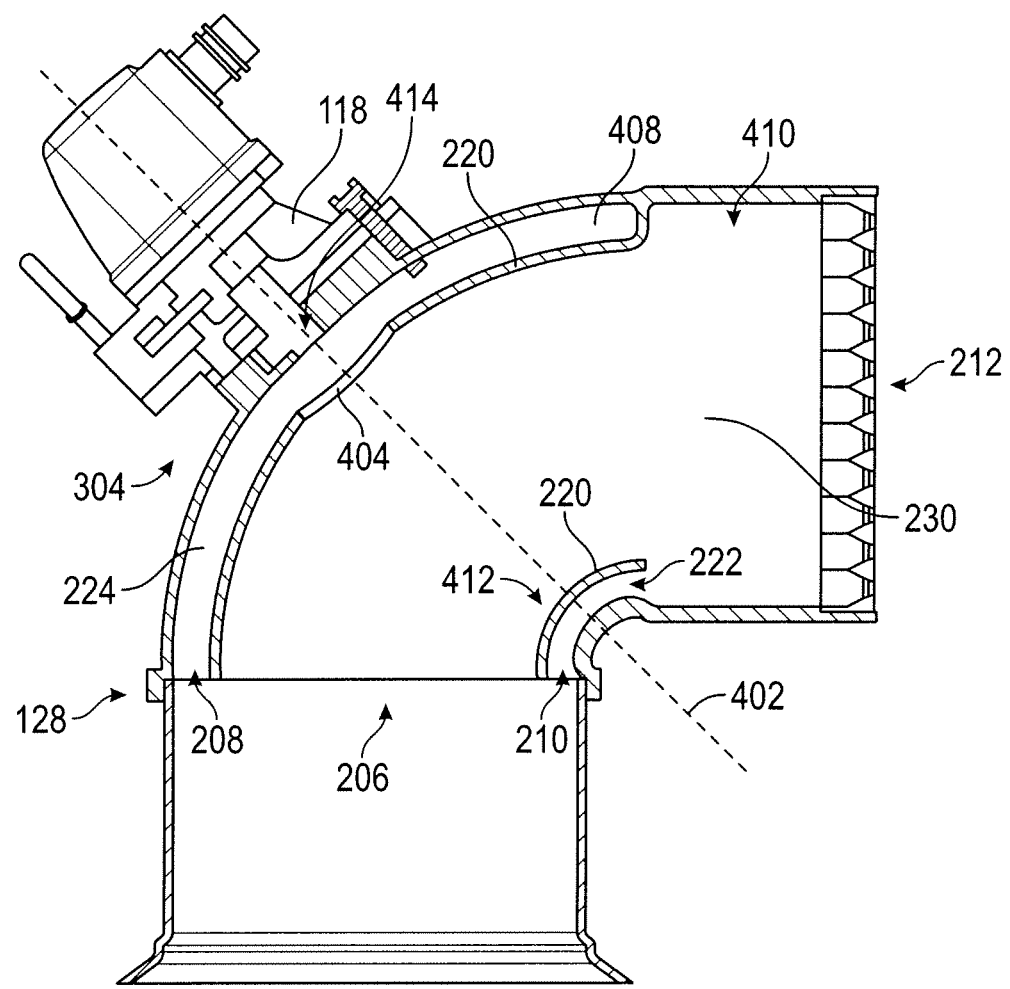
FIG. 4 is a cross-sectional view of a flow separator disposed into the exhaust configuration of FIG. 1.

FIG. 4 illustrates one form of the injector 118 and the reduction orifice 204. The bend 304 approximates a 90 degree bend across an axis 402. The injector 118 can be configured to spray directly toward the inner radius 412 along the axis 402. However, it is contemplated that the injector 118 can spray +45 degrees with respect to axis 402. As was previously discussed, the primary flow 206 flows through a primary flow path 230 of the decomposition chamber 134. A portion of the exhaust gas 112 is separated into a bypass passage 222. An injector flow 208 flows through the injector flow path 224 toward the injector tip 414. The injector 118 is structured to inject DEF through an aperture 404 in the inner surface 220. The aperture 404 can be of a size sufficient to prevent any of the aqueous DEF droplets 124 from entering the injector flow path 224. A blockage 410 is structured to provide an exhaust pocket 408 within the injector flow path 224. The exhaust pocket 408 is maintained at a sufficient pressure from the injector flow 208 to prevent of the aqueous DEF droplets 124 drift into the injector flow path 224. As the injector flow 208 exits through the aperture 404, of the aqueous DEF droplets 124 drift flows with the injector flow 208; thereby, aiding in the reduction of deposit formation at the injector 118. Additionally, as the injector flow 208 and the primary flow 206 impinge on both sides of the inner surface 220, heat transfer from the flow of the exhaust gas 112 is substantially increased over a conventional exhaust system. Convection from the primary flow 206 of exhaust and bypass flow 210 also increases the heat transfer to the inner radius 412 such that any DEF which may be sprayed thereon can evaporate and reduce the likelihood of deposit formation.

Figure 5A:
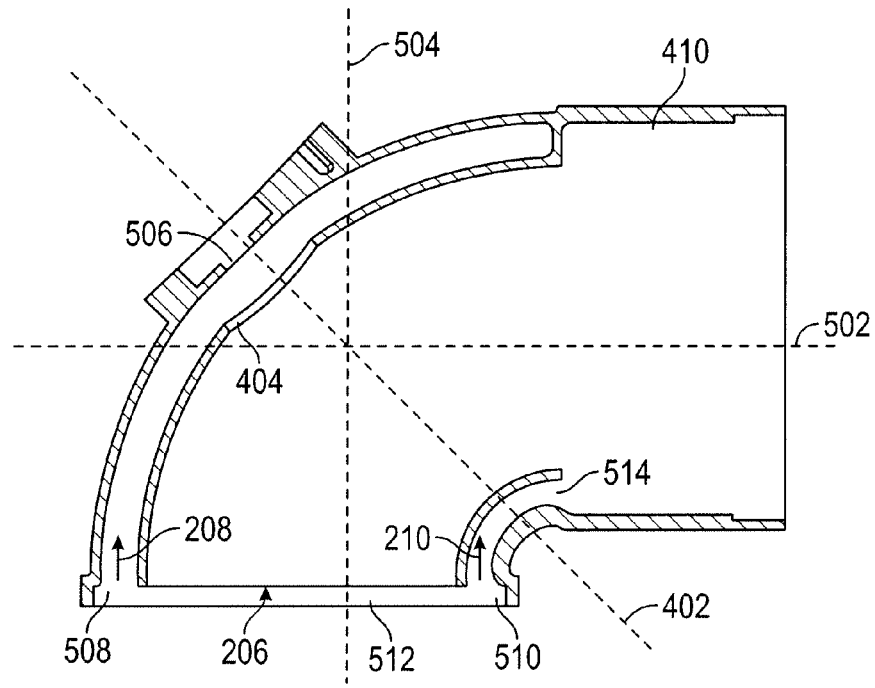
FIGS. 5A-5C are partial cross-sectional views along various planes of the bend and flow separating annulus of FIG. 4.
Figure 5B:
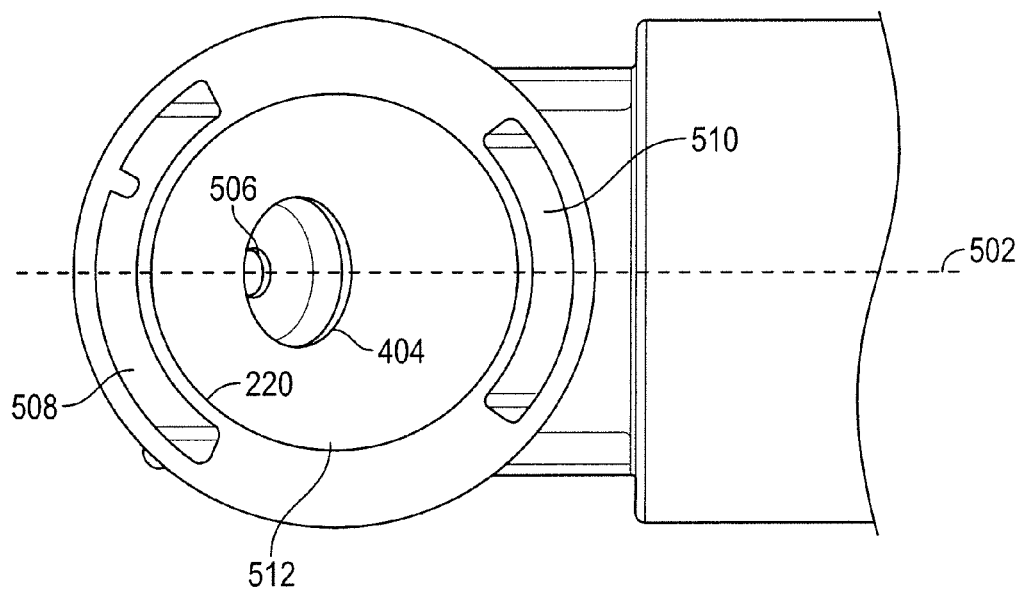
Figure 5C:
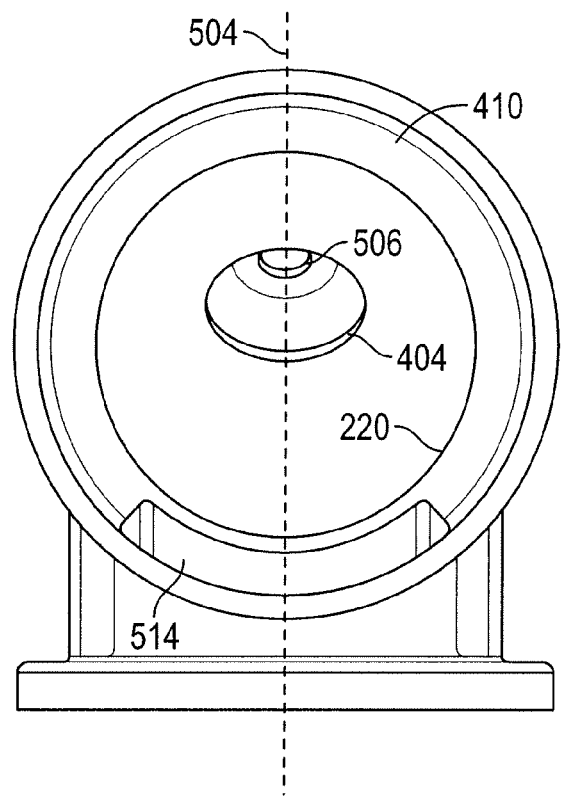

Referring now to FIGS. 5A-5C, the decomposition chamber 134 of FIG. 4 is depicted. FIG. 5A illustrates a side cutaway as was shown in FIG. 4. Axis 502 and 504 are provided solely for reference purposes. Located at 506 is an injector aperture where the tip 414 of the injector 118 abuts against the exhaust passageway 228. An opening 508 of the injector flow path 208, an opening of the primary flow path 512, and an opening 510 and exit 514 of the bypass flow path are also illustrated. Referring now to FIG. 5B, the decomposition tube of FIG. 5A has been rotated 90 degrees with respect to axis 502. FIG. 5C illustrates the decomposition tube of FIG. 5A rotated 90 degrees relative to axis 504. As was aforementioned, the sizes and shapes of the openings 508, 512, 510 and of the exit 514 are application specific.

Figure 6:
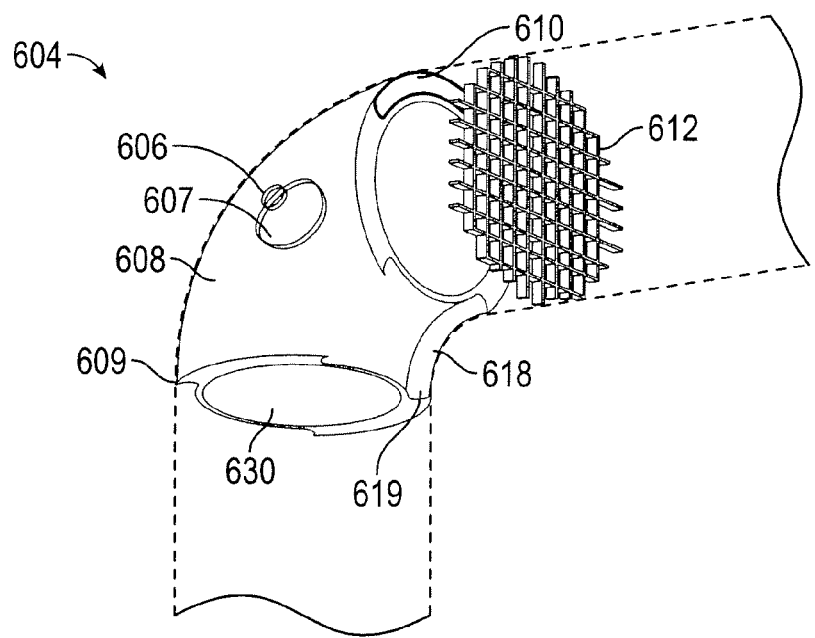
FIG. 6 is a perspective view of a decomposition tube elbow, in accordance with example embodiments.

FIG. 6 is a perspective view of a decomposition tube elbow, in accordance with example embodiments. A deposit mitigation system includes a decomposition tube elbow 604. The decomposition tube elbow 604 includes an injector port 606 for receiving an injector (such as the injector 118) coupled to a doser for spraying DEF into the decomposition tube elbow 604. Specifically, an injector positioned in the injector port 606 sprays DEF into the decomposition tube elbow 604 and the DEF is transmitted through an injection inlet 607 into a primary exhaust stream flowing through a primary exhaust flow path 630. The decomposition tube elbow 604 includes an injector exhaust flow path 608, including an exhaust inlet 609 and an exhaust outlet 610.

The exhaust inlet 609 receives exhaust separated from the primary exhaust stream flowing through primary exhaust flow path 630. The exhaust received via the exhaust inlet 609 and flowing through the injector exhaust flow path 608 is transmitted by the injector port 606 to warm the DEF fluid as it first leaves the injector positioned in the injector port 606 and before it descends through the injection inlet 607 into the primary exhaust flow path 630. The decomposition tube elbow 604 also includes a bypass exhaust flow path 618 positioned in an interior bend of the decomposition tube elbow 604. The bypass exhaust flow path 618 includes a bypass inlet 619 and a bypass outlet 620. The bypass exhaust flow path 618 receives exhaust separated from the primary exhaust stream flowing through primary exhaust flow path 630 to warm an interior wall surface 622 to increase heat transfer to the interior wall surface 622 and help prevent deposits from forming thereon. The decomposition tube elbow 604 also includes a full mixer 612 in the illustrated embodiments shown in FIG. 6. The full mixer 612 is configured to facilitate mixing of injected reductant and exhaust gas flowing through the decomposition tube elbow 604.

Figure 7:
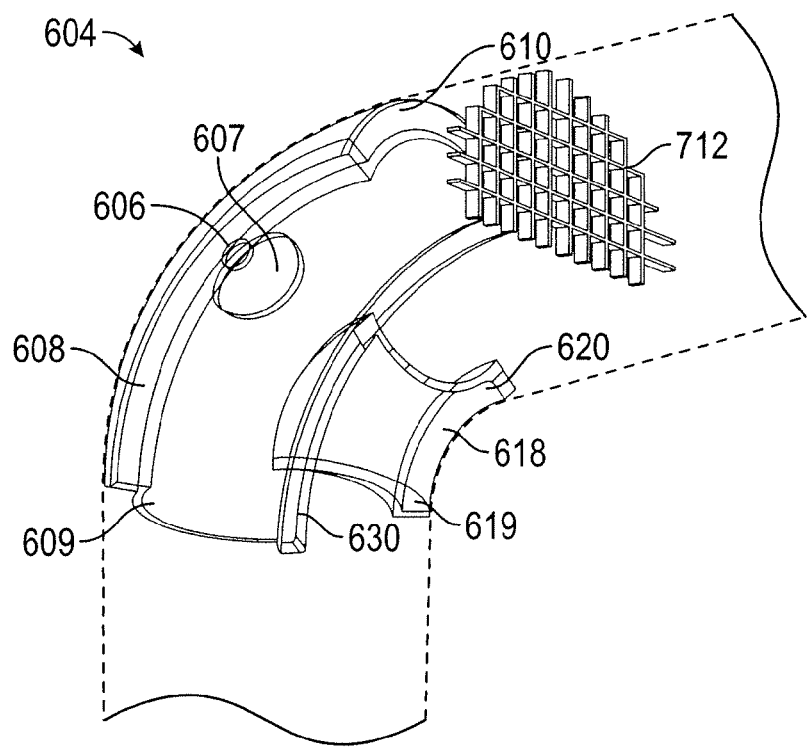
FIG. 7 is a perspective view of a decomposition tube elbow including a half mixer, in accordance with example embodiments.

FIG. 7 is a perspective view of a decomposition tube elbow including a half mixer, in accordance with additional embodiments. In contrast to the configuration shown in FIG. 6, the decomposition tube elbow 604 includes a partial mixer including, but not limited to, a half mixer 712 positioned within the decomposition tube elbow 604.

Figure 8A:
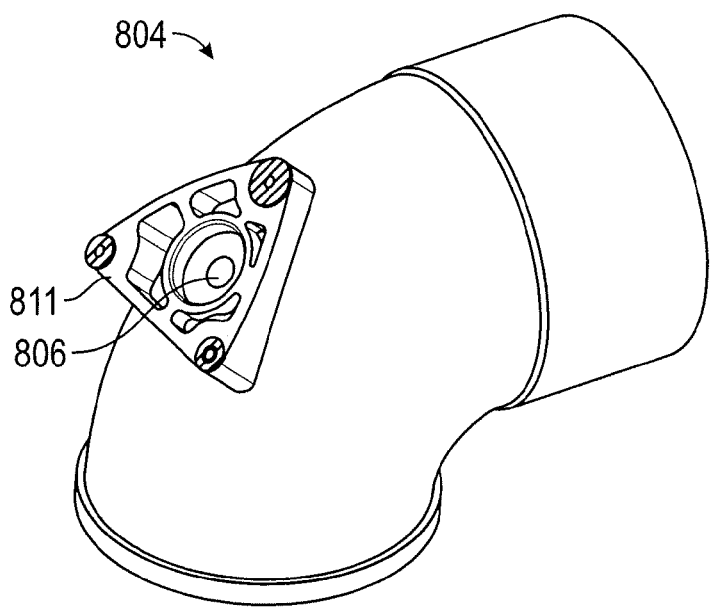
FIGS. 8A-8C are a decomposition tube elbow according to further example embodiments.
Figure 8B:
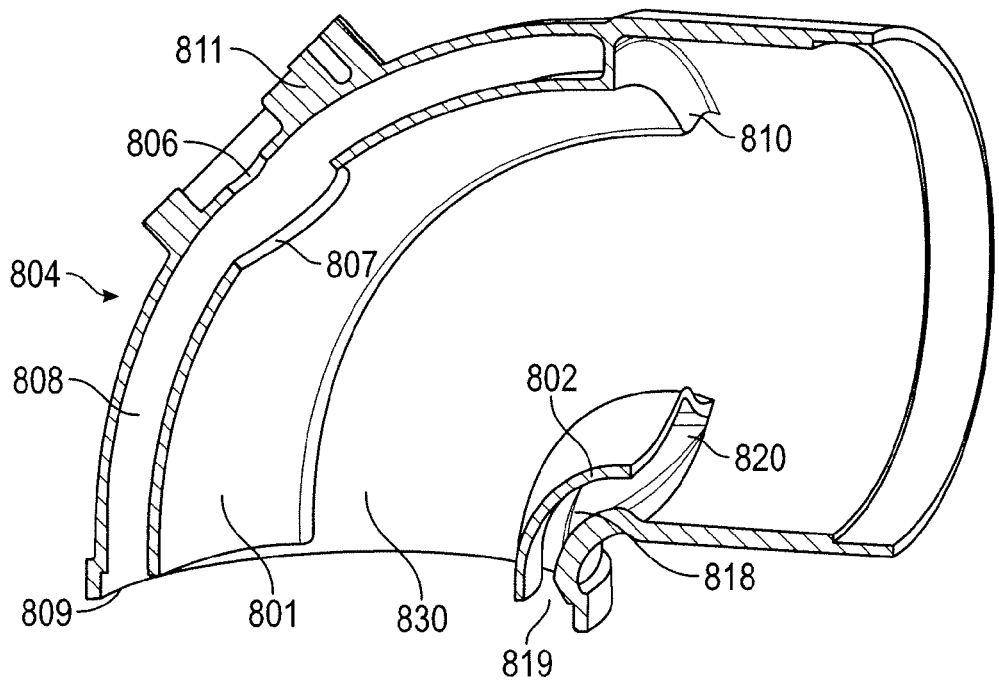
Figure 8C:
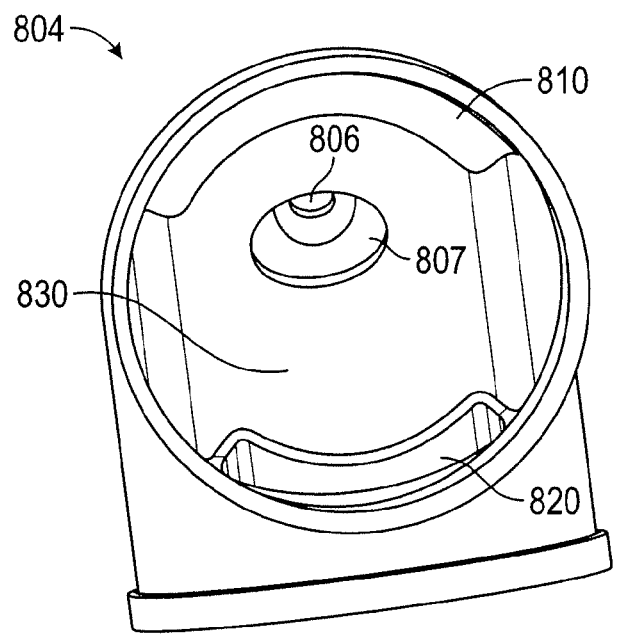

FIGS. 8A-8C are a decomposition tube elbow according to further example embodiments. Specifically, FIG. 8A is an exterior view a decomposition tube elbow, FIG. 8B is a cross-sectional view of the decomposition tube elbow 804, and FIG. 8C is an end view of the decomposition tube elbow 804. The decomposition tube elbow includes an injector dock 811 configured to receive an injector, such as injector 118, mounted thereon. The decomposition tube elbow 804 is shown including an injector exhaust flow path 808 formed by an injection exhaust flow path divider wall 801. The injector exhaust flow path 808 includes an exhaust inlet 809 and an exhaust barrier 810. The exhaust received via the exhaust inlet 809 and flowing through the injector exhaust flow path 808 is transmitted pass the injector port 806 to warm the DEF fluid as it first leaves a injector positioned in the injector port 806 before it descends through the injection inlet 807 into a primary exhaust flow path 830. The decomposition tube elbow 804 also includes a bypass exhaust flow path 818 positioned in an interior bend of the decomposition tube elbow 804. The bypass exhaust flow path 818 is formed by a bypass exhaust flow path divider wall 802. The bypass exhaust flow path 818 includes a bypass inlet 819 and a bypass outlet 820. The bypass exhaust flow path 818 receives exhaust separated from the primary exhaust stream flowing through primary exhaust flow path 830 to warm interior wall surface 822 to increase heat transfer to the interior wall surface 822 and help prevent deposits from forming thereon.

In distinction to the decomposition tube elbow 604, the decomposition tube elbow 804 includes the primary exhaust flow path 830 where the side walls (i.e. the primary exhaust flow path walls extending between the bypass exhaust flow path 818 and the injector exhaust flow path 808) expand further radially outward between the bypass exhaust flow path 818 and the injector exhaust flow path 808 than the inner wall surfaces 822 and 823. Accordingly, the primary exhaust flow path 830 has a cross section having a variable radius and an increased cross sectional area that reduces the pressure drop for the same exhaust flow conditions. In example embodiments, the decomposition tube elbow 804 includes a mixer, including, but not limited to a full mixer extending across the entire cross section of the decomposition tube elbow 804 or a partial mixer extending across a part of the cross section of the decomposition tube elbow, such as halfway across.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system, comprising:
   an internal combustion engine configured to produce an exhaust gas flow;
   an exhaust gas passageway, at least a portion of the exhaust gas passageway comprising:
   a primary passageway,
   an injector passageway adjacent to, and sharing a first wall portion with, the primary passageway, the first wall portion including an injector aperture, and
   a bypass passageway adjacent to, and sharing a second wall portion with, the primary passageway, the second wall portion and the first wall portion located at opposite sides of a centerline of the primary passageway;
   a reductant injector exposed in the primary passageway through the injector aperture, an end of the injector in a flow path defined by the injector passageway, the injector configured to release a reductant into the primary passageway and towards the bypass passageway; and
   a catalyst located downstream of the reductant injector, the catalyst configured to receive a primary flow through the primary passageway, the primary flow mixed with the reductant.

2. The system of claim 1, further comprising an orifice disposed within the portion of the exhaust gas passageway, the orifice structured to define the primary passageway, the injector passageway, and the bypass passageway.

3. The system of claim 2, wherein the orifice is configured to direct a flow in the flow path defined by the injector passageway to assist in flowing the reductant from the injector toward a centerline of the exhaust gas passageway.

4. The system of claim 2, wherein the bypass passageway includes an opening located upstream of the injector, wherein the bypass passageway is structured to increase a temperature of a portion of an outer wall of the passageway such that reductant received thereon will evaporate.

5. The system of claim 4, wherein the bypass passageway is structured to provide a reductant free flow to a location downstream of the injector, whereby impingement of the reductant upon the walls of the exhaust gas passageway is reduced.

6. The system of claim 1, wherein the portion of the exhaust gas passageway further comprises a bend, at least a portion of the bend located downstream from the reductant injector.

7. The system of claim 6, wherein the reductant injector is on an outer radius of the bend, and wherein the injector is structured to release the reductant toward an inner radius of the bend.

8. The system of claim 1, further comprising one or more mixing devices disposed downstream of the bypass passageway, wherein the bypass passageway is structured to provide a reductant free flow to a location downstream of the injector.

9. The system of claim 1, wherein the internal combustion engine is a diesel engine, wherein at least a portion of the reductant is urea and wherein the catalyst comprises at least a portion of a selective catalytic reduction (SCR) bed.

10. The system of claim 1, wherein the reductant injector is an airless injector.

11. An apparatus, comprising:
an internal combustion engine structured to produce an exhaust flow;
an exhaust system structured to receive the exhaust flow;
a reductant injector structured to inject reductant into a primary passage of the exhaust system upstream of a catalyst;
a bypass passage structured to receive a portion of exhaust upstream of the injector and to release the portion of exhaust downstream of the injector; and
an injector passage structured to receive a portion of exhaust upstream of the reductant injector and further structured to flow the exhaust into the primary passage around the reductant injector in a manner such that injector tip deposit formation is mitigated, the injector passage and the bypass passage located at opposite sides of a centerline of the primary passage.

12. The apparatus of claim 11, wherein the bypass passage is structured to increase a heat transfer from the exhaust to a surface of the bypass passage.

13. The apparatus of claim 12, wherein the bypass passage further includes a mixer located near a bypass exit.

14. The apparatus of claim 11, wherein the reductant injector is located near a bend in the exhaust system.

15. The apparatus of claim 14, wherein the bend is a 90 degree bend and wherein the injector is located on an outer radius of the bend.

16. The apparatus of claim 12, wherein the bypass passage extends annularly around at least a portion of an inner circumference of the exhaust system.

17. The apparatus of claim 12, wherein the injector is an airless injector.

18. A method, comprising:
operating an internal combustion engine including a rotating assembly, whereby an exhaust flow is produced and provided to an exhaust passageway;
selectively injecting a reductant into a main portion of the exhaust flow, the reductant injected by an injector exposed from a first interior wall of the exhaust passageway, the reductant injected toward a second interior wall of the exhaust passageway, the first interior wall and the second interior wall located at opposite sides of a centerline of the exhaust passageway;
diverting a first portion of the exhaust flow across a tip of the injector thereby reducing reductant deposits thereon;
diverting a second portion of the exhaust flow into a bypass passageway adjacent to the second interior wall of the exhaust passageway.

19. The method of claim 18,
wherein the bypass passageway is structured to increase a heat transfer rate from the exhaust flow to a surface of the bypass passageway.

20. The method of claim 18, wherein the diverting a second portion of the exhaust flow into a bypass passageway further includes altering a flow velocity of the second portion of the exhaust flow in the bypass passageway through a flow altering device located at an exit of the bypass passageway.

21. The method of claim 18, wherein the second portion of the exhaust flow is reductant free exhaust flow flowing near an inner surface of the exhaust system, thereby reducing impingement of the reductant thereon.

22. A decomposition mitigation assembly, comprising:
a decomposition tube elbow including an inner bend wall portion and an outer bend wall portion,
an injector port formed in the outer bend wall portion, the injector port configured to receive a reductant injector therein;
an injection exhaust flow path divider wall positioned in the decomposition tube elbow, the injection exhaust flow path divider wall forming a first passageway extending along at least a portion of the outer bend wall portion; and
a bypass exhaust flow path divider wall positioned in the decomposition tube elbow, the bypass exhaust flow path divider wall forming a second passageway extending along at least a portion of the inner bend wall portion of the decomposition tube elbow, the bypass exhaust flow path divider wall and the injection exhaust flow path divider wall forming a primary exhaust flow passageway positioned in the decomposition tube elbow between the injection exhaust flow path divider wall and the bypass exhaust flow path divider wall.

23. The decomposition mitigation assembly of claim 22, further comprising an injector docking platform on the outer bend wall portion at the injector port, the injector docking platform configured to receive and mount the reductant injector.

24. The decomposition mitigation assembly of claim 23, further comprising the reductant injector fastened to the injector docking platform.

* * * * *